3,036,088
N-(FLUOROALKYLTHIO)-IMIDES

John F. Harris, Jr., Wilmington, Del., assignor to E. I. du Pont de Nemours and Company, Wilmington, Del., a corporation of Delaware
No Drawing. Filed Oct. 8, 1959, Ser. No. 845,071
7 Claims. (Cl. 260—326)

This invention relates to new N-thio-substituted imides of dibasic acids wherein the sulfur has directly attached thereto a fluorinated organic radical. The invention is also concerted with the preparation of these thioimides.

Imides, including phthalimides, have achieved some importance in biological applications. No investigations have heretofore been reported on N-thiomides having fluorine in the radical attached to the thioimide sulfur atom.

There has now been obtained a new class of N-thioimides wherein the sulfur is attached to carbon of a fluorine-containing radical. These N-thioimides have a plurality of fluorine atoms in the fluorine-containing radical attached to the thioimide group.

The compounds of this invention include those of the formula

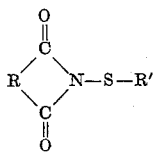

wherein R is a hydrocarbon radical of from 2 to 7 carbons, and R' is hydrocarbyl, and has a plurality of both carbon and fluorine atoms. The maximum number of carbons on R' can be of the order of 17 or even higher; furthermore, inert groups such as chlorine can be present.

When a plurality of fluorine is present in the R' portion of the compounds of this invention, superior properties are obtained, e.g., as agents preventing insect attack. Particularly preferred compounds are those having two fluorine atoms on the carbon directly attached to the sulfur. This superiority in insect repellency for compounds wherein R' contains two fluorines is evidently due to the unusual properties this specific halogen introduces into compounds for which specific differences over other halogens are recognized in Simons, "Fluorine Chemistry," Academic Press, N.Y., 1950, page 402, and Henne and Midgley, J. Am. Chem. Soc. 58, 882 (1936).

The new N-thiosubstituted imides of this invention are obtained by reaction of an alkali metal salt of an imide such as phthalimide, succinimide, or endomethylenetetrahydrophthalimide with a sulfenyl chloride of the formula Cl—S—R' wherein R' is as previously defined. The reaction takes place at room temperature, although lower or higher temperatures can be used. Inert solvents or diluents can be present. Although anhydrous conditions are generally preferred, in some cases aqueous reaction media can be used. The new compounds of this invention are soluble in organic solvents and are isolated by crystallization from a solvent or by evaporation of the solvent. The new N-substituted thioimides are generally crystalline and purified by the use of appropriate solvents.

The following examples in which the parts given are by weight further illustrate the preparation and properties of the compounds of this invention.

EXAMPLE I
N-(2-Chloro-1,1,2-Trifluoroethylthio)Phthalimide

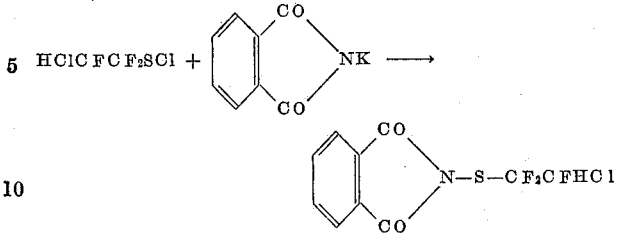

Ten parts of finely divided potassium phthalimide was added to a solution of 6.4 parts of 2-chloro-1,1,2-trifluoroethanesulfenyl chloride in 100 parts of dry benzene. The mixture was stirred at room temperature until the characteristic yellow color of the sulfenyl chloride disappeared. Then, 100 parts of water was added, and the mixture stirred vigorously. A small amount of suspended solid was removed by filtration. The water layer was separated, and the benzene layer was extracted once with 100 parts of water. Upon evaporation of the benzene layer, there remained 6.85 parts (67%) of crude N-(2-chloro-1,1,2-trifluoroethylthio)phthalimide melting at 100–102° C. One recrystallization from cyclohexane raised the melting point to 106–107° C.

*Analysis.*—Calcd. for $C_{10}H_5ClF_3NO_2S$: C, 40.6; H, 1.7; S, 10.9. Found: C, 41.0; H, 2.0; S, 10.6.

The 2-chloro-1,1,2-trifluoroethanesulfenyl chloride was obtained by addition of hydrogen sulfide to chlorotrifluoroethylene in the presence of ionizing radiation followed by chlorination of the 2-chloro-1,1,2-trifluoroethanethiol as follows:

A mixture of 104 parts of hydrogen sulfide and 150 parts of chlorotrifluoroethylene was irradiated in a stainless steel cylinder with X-rays for four hours at a dose rate of approximately 10,000 rads/minute. After removal of the starting material, the liquid residue (134.2 parts) was distilled. There was obtained 115.6 parts (59%) of 2-chloro-1,1,2-trifluoroethanethiol distilling at 65–67° C.; $n_D^{25}$, 1.3791. The proton and fluorine nuclear magnetic resonance spectra confirmed the structure of the product.

*Analysis.*—Calcd. for $C_2H_2F_3ClS$: C, 16.0; H, 1.3; S, 21.3. Found: C, 16.7; H, 1.8; S, 21.0.

Chlorine gas (dried by bubbling through concentrated sulfuric acid) was passed through a refluxing solution of 20 parts of 2-chloro-1,1,2-trifluoroethanethiol in 50 parts of methylene chloride for a period of 2½ hours. Distillation of the reaction mixture yielded 11.3 parts (46% of theory) of 2-chloro-1,1,2-trifluoroethanesulfenyl chloride boiling at 95–98° C. and 7.3 parts (38% of theory) of bis-2-chloro-1,1,2-trifluoroethyl disulfide distilling at 67–72° C./12 mm.

*Analysis.*—Calcd. for $C_2F_3Cl_2S$: F. 30.8; Cl, 38.3; S, 17.4. Found: F, 31.2; Cl, 38.3; S, 17.1.

EXAMPLE II
N-(1,1,2,2-Tetrafluoroethylthio)Phthalimide

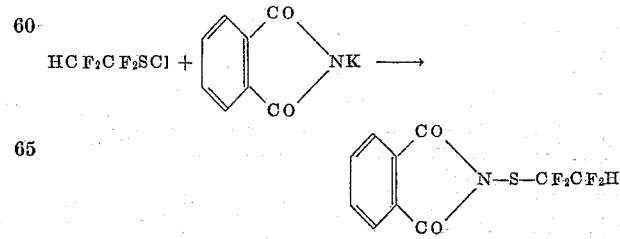

Sixteen parts of finely divided potassium phthalimide was added to a cooled (ice-water bath) solution of 14.4 parts of 1,1,2,2-tetrafluoroethanesulfenyl chloride in 175 parts of benzene. This mixture was stirred for 15 minutes, and then an additional five parts of potassium phthalimide was added. The mixture was then allowed to stir overnight. The solvent was removed by evaporation, and the solid residue extracted with 300 parts of water, dried, and then dissolved in 300 parts of benzene. After this solution was filtered, it was evaporated to dryness. There was obtained 12.0 parts (50%) of crude N-(1,1,2,2-tetrafluoroethylthio)phthalimide. Upon recrystallization from carbon tetrachloride, the product was obtained as white crystals melting at 106–106.5° C.

Analysis.—Calcd. for $C_{10}H_5F_4NO_2S$: C, 43.0; H, 1.8; F, 27.2; S, 11.5. Found: C, 43.7; H, 1.9; F, 26.6; S, 11.3.

The tetrafluoroethanesulfenyl chloride was obtained by radiation induced addition of hydrogen sulfide to tetrafluoroethylene followed by chlorination as follows:

A mixture of 30 parts of tetrafluoroethylene and 35 parts of hydrogen sulfide was charged into a stainless steel cylinder and irradiated with X-rays for three hours at an average dose rate of approximately 10,000–15,000 rads/minute. After removal of volatile material, the liquid residue was distilled through a spinning band still. There was obtained 24 parts (60% of theory) of 1,1,2,2-tetrafluoroethanethiol boiling at 25–27° C. Proton and fluorine nuclear magnetic resonance spectra confirmed the structure of the product.

Analysis.—Calcd. for $C_2H_2F_4S$: S, 23.9; F, 56.7. Found: S, 24.3; F, 56.6.

Chlorine was passed into 20.4 parts of 1,1,2,2-tetrafluoroethanethiol maintained at room temperature in a container fitted with a condenser containing an acetone-solid carbon dioxide. When the mixture contained an excess of chlorine, it was allowed to reflux overnight. Upon distillation of the reaction mixture, there was obtained 17.1 parts (67% of theory) of 1,1,2,2-tetrafluoroethanesulfenyl chloride as a yellow liquid distilling at 57–59° C.; $n_D^{25}$, 1.3610.

Analysis.—Calcd. for $C_2HF_4ClS$: F, 45.1; Cl, 21.1; S, 19.0. Found: F, 45.5; Cl, 21.1; S, 19.6.

EXAMPLE III

N-(2-Chloro-1,1,2-Trifluoroethylthio)-4-Cyclohexene-1,2-Dicarboximide

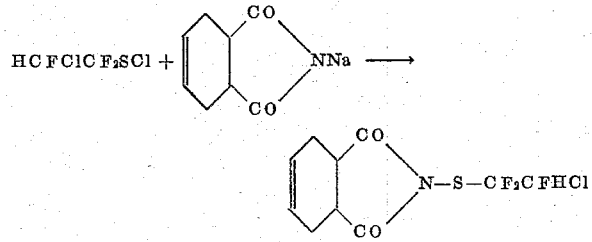

Eight parts of finely divided sodium 4-cyclohexene-1,2-dicarboximide was added to a solution of 5.35 parts of 2-chloro-1,1,2-trifluoroethanesulfenyl chloride in 44 parts of benzene. The mixture was stirred and cooled (ice-water bath) for 10 minutes and then another 2 parts of sodium 4-cyclohexene-1,2-dicarboximide was added. After being stirred for another half hour, the mixture was warmed in a warm-water bath, filtered, and the residue rinsed with benzene. Evaporation of the filtrate and rinsings yielded 8.29 parts of N-(2-chloro-1,1,2-trifluoroethylthio)-4-cyclohexene-1,2-dicarboximide as an oil which slowly crystallized. This material was slurried with pentane, filtered, and air-dried. There was thus obtained 7.82 parts of the product melting at 43.5–45° C. Several recrystallizations from aqueous methanol raised the melting point to 53–54° C.

Analysis.—Calc'd for $C_{10}H_9ClF_3NO_2S$: Cl, 11.8; F, 19.0 N, 4.7. Found: Cl, 11.8; F, 18.7; N, 4.8.

EXAMPLE IV

N-(2-Chloro-1,1,2-Trifluoroethylthio)Succinimide

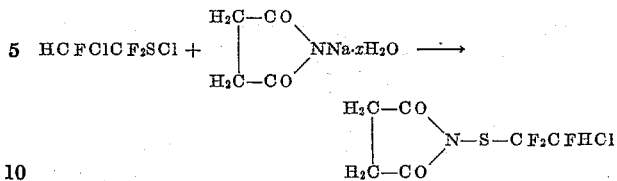

A solution of 5 parts of 2-chloro-1,1,2-trifluoroethanesulfenyl chloride in 22 parts of benzene was added dropwise to a suspension of 8.0 parts of the hydrated sodium salt of succinimide suspended in 44 parts of benzene. After a few minutes, an additional 3.0 parts of the salt was added. The mixture was then filtered, and the filtrate was evaporated to dryness in vacuo. There remained 5.9 (88%) parts of crude N-(2-chloro-1,1,2-trifluoroethylthio)succinimide as a crystalline solid melting at 88–90.5° C. After recrystallization from aqueous methanol, the melting point was 92–93° C.

Analysis.—Calcd. for $C_6H_5ClF_3NO_2S$: C, 29.1; H, 2.0; F, 23.0. Found: C, 29.4; H, 2.1; F, 23.3.

When heptafluoropropanesulfenyl chloride (available by the chlorination of perfluoropropanethiol—see Haszeldine and Kidd, J. Chem. Soc. 1955, 3871) is used in the previously described general procedure, there results, eg., N-(perfluoropropylthio)phthalimide. Similarly, 4 - hydroperfluoroheptane-4-sulfenyl chloride (by chlorination of the reaction product of perfluoroheptanone-4 with hydrogen sulfide at 3000 atmospheres for five hours at 200° C.) with phthalimide gives N-(4H-tetradecafluoro-4-heptylthio)phthalimide. Likewise, 1,17 - dihydroperfluoro-9-heptadecanone gives the 1,9,17-trihydroperfluoroheptadecanethiol-9 from which via the sulfenyl chloride N-(1H,9H,17H - dotriacontafluoro - 9 - heptadecylthio) phthalimide is obtained.

The compounds of this invention, and particularly the N-thioaliphatic compounds having a plurality of fluorines, are useful to prevent insect attack. Compositions comprising these new compounds can be in the form of liquid, dust, cream, lotion, or in stick form. More will be said later about how to adapt the compounds of this invention for use as insect repellents. The compounds are generally solids and have low volatility. When applied to vegetation or sources of insect food, they are active for a long period of time to prevent feeding by insects. They may be present in amounts of the order of 0.5 to 25% or higher in the composition used for application to areas to prevent insect attack and in much smaller amounts on the objects being protected. The compounds are also useful in other biological applications, e.g., they control apple scab.

In order to adapt the compounds of this invention for use as insect repellents or for other uses, the compounds are formulated according to conventional practices to provide a dust, or a water dispersible powder or an emulsifiable oil or a solution in an organic solvent or some such other form suitable for the desired type of application. For this purpose, the compounds are admixed with a dust diluent, a wetting, dispersing or emulsifying agent, or a solvent or a combination of these materials.

Dust compositions of the invention are prepared, for example, by mixing the active ingredients with a finely divided solid such as talc, pyrophyllite, natural clays, diatomaceous earths and other powdered diluents such as those given in U.S. Patent 2,426,417.

A wide variety of wetting, dispersing and emulsifying agents can be employed in preparing water dispersible dusts or emulsifiable oils of the compounds of the invention. Such surface active agents are set out in detail in an article by McCutcheon in "Soap and Chemical Specialties" December 1957; January, February, March, April 1958.

Formulations and method of use of the compounds of this invention are illustrated in the following examples:

EXAMPLE V

Twelve and one-half grams of the product of Example I, N - ( 2 - chloro - 1,1,2 - trifluoroethylthio)phthalimide, are dissolved in 82.5 grams of xylene and then 5 grams of isooctyl phenyl polyoxyethanol are added to the mixture. There is obtained a clear solution which when added to water forms an oil-in-water emulsion. The oil-in-water emulsion containing 4% of the above composition equivalent to .5% of the phthalimide is applied to run off by hand sprayer to baseboards, under sinks, behind cabinets and to basement walls of a restaurant kitchen. German and American roaches are repelled from the treated areas for a period of several weeks.

Fifty grams of N-(2-chloro-1,1,2-trifluoroethylthio)-phthalimide are blended with 950 grams of dusting talc and then reduced to a very small particle size in an air attrition mill. This dust mixture containing 5% of the phthalimide is dusted behind baseboards, under rugs, and in closets of a house. Ants, roaches, carpet beetles and other household pests are repelled by this treatment. Rugs, fabrics and similar materials are protected from insect injury.

EXAMPLE VI

Five hundred grams of the product of Example II, N-(1,1,2,2-tetrafluoroethylthio)phthalimide, are blended with 470 grams of finely ground attapulgite clay, 10 grams of sodium alkyl naphthalene sulfonate and 20 grams of sodium lignin sulfonate and then the blended mixture is reduced to a very small particle size in an air attrition mill. The final composition containing 50% of the phthalimide is added to water with agitation to give a fine dispersion. A water dispersion containing 2 lbs./100 gallons of this wettable powder is applied to the foliage of elm, linden, grape and sycamore around a home site for protection from Japanese beetle attack. The leaves of the treated plants are undamaged while nearby untreated plants are severely injured.

Five grams of this product are dissolved in 95 grams of tetrachloroethylene to give a clear solution. This solution may be further diluted to any desired concentration. Woolen garments are dipped in a 1% solution and allowed to dry. By this treatment, garments are protected from damage by clothes moths and carpet beetles during extended storage.

EXAMPLE VII

Thirty grams of the product of Example III, N-(2-chloro - 1,1,2 - trifluoroethylthio) - 4 - cyclohexene - 1,2-dicarboximide, are dissolved in 70 grams of cyclohexanone to give a clear solution. This concentrated solution is diluted further to a concentration of 1% and painted on the walls of an area used for storing sacked grains. Roaches, flour beetles, rodents, and other vermin are repelled from the treated surfaces.

EXAMPLE VIII

Five parts of the product of Example IV, N-(2-chloro-1,1,2-trifluoroethylthio)-succinimide, are blended with 45 parts of lanolin and 45 parts of petrolatum and warmed to 100° C. The mixture is stirred constantly while being cooled to room temperature. There is thus obtained a cream containing 5% of the compound. This cream is applied to surfaces to protect them from insect attack.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. Compounds of the formula

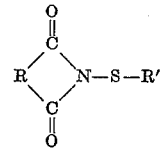

wherein R is a member selected from the group consisting of o-benzene, o-tetrahydrobenzene, and ethylidene diradicals, and R' is a haloalkyl radical of 2–17 carbon atoms, in which two fluorine atoms are attached to the carbon directly linked to sulfur, the remaining valences of said carbon atoms satisfied by other than carbon are satisfied by members selected from the group consisting of hydrogen, chlorine and fluorine.

2. An N-(polyhaloalkylthio)phthalimide in which the polyhaloalkyl group is of 2 to 17 carbon atoms and wherein two fluorine atoms are attached to the carbon which is directly attached to sulfur, the remaining valences of said carbon atoms satisfied by other than carbon are satisfied by members of the group consisting of hydrogen, chlorine and fluorine.

3. An N-(polyhaloalkylthio)-4-cyclohexene-1,2-dicarboximide in which the polyhaloalkyl group is of 2 to 17 carbon atoms and wherein two fluorine atoms are attached to the carbon directly linked to sulfur and the remaining valences of said carbon atoms satisfied by other than carbon are satisfied by members of the group consisting of hydrogen, chlorine and fluorine.

4. N-(2-chloro-1,1,2-trifluoroethylthio)phthalimide.
5. N-(1,1,2,2-tetrafluoroethylthio)phthalimide.
6. N - (2 - chloro - 1,1,2 - trifluoroethylthio) - 4 - cyclohexene-1,2-dicarboximide.
7. N-(2-chloro-1,1,2-trifluoroethylthio)succinimide.

References Cited in the file of this patent

UNITED STATES PATENTS

| | | |
|---|---|---|
| 2,553,770 | Kittleson | May 22, 1951 |
| 2,861,990 | Cleaver et al. | Nov. 25, 1958 |

OTHER REFERENCES

Henne et al.: J. Am. Chem. Soc., page 882, vol. 58 (1936).

The Chemistry of Acetylene and Related Compounds, page 89, Interscience Publishers Inc., New York (1948).

Simons: Fluorine Chemistry, page 402 (1950).